B. F. WARD.
Cultivator.
No. 98,650. Patented Jan. 4, 1870.
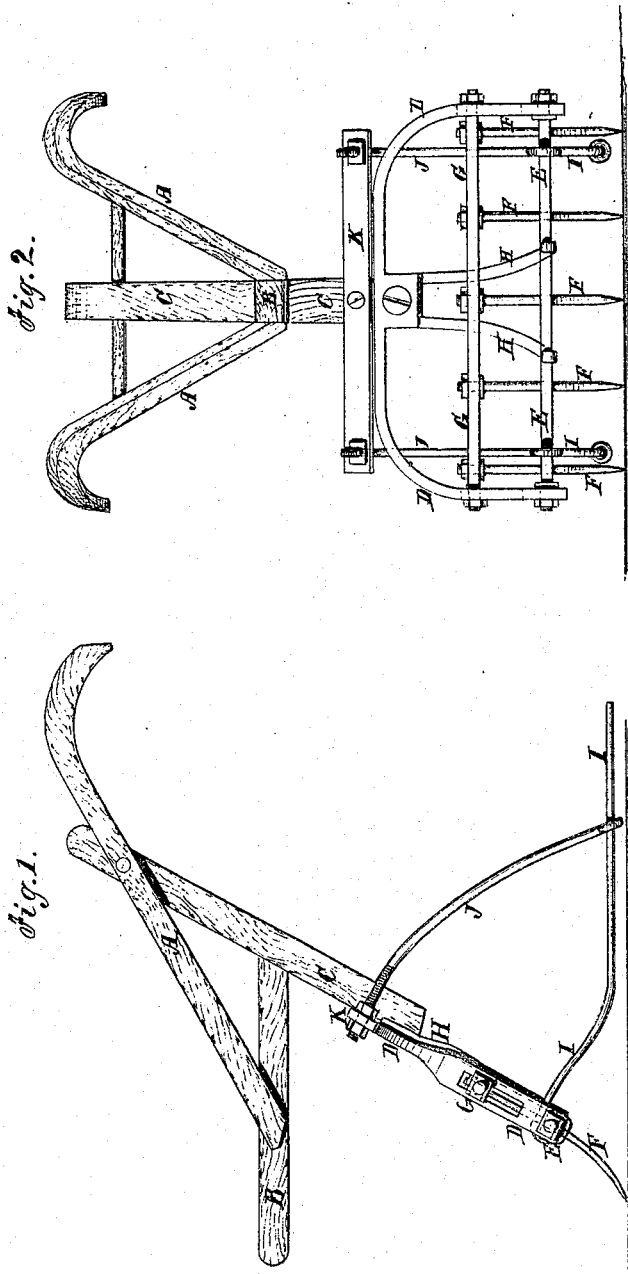

UNITED STATES PATENT OFFICE.

B. F. WARD, OF INDIAN SPRINGS, GEORGIA.

IMPROVEMENT IN CULTIVATORS.

Specification forming part of Letters Patent No. 98,650, dated January 4, 1870.

*To all whom it may concern:*

Be it known that I, B. F. WARD, of Indian Springs, in the county of Butts and State of Georgia, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a side view of my improved cultivator. Fig. 2 is a front view of the same.

Similar letters of reference indicate corresponding parts.

My invention has for its object to furnish a simple, convenient, effective, and cheap machine designed more particularly for cultivating plants planted in hills and drills, but which may be used with great advantage for preparing the ground to receive the seed, and for covering seeds planted in hills or drills, and which, from its lightness and manner of operating, will leave the ground lighter and more thoroughly pulverized than is possible when the ordinary heavy harrows, sweeps, cultivators, and plows are used; and it consists in the construction and combination of various parts of the machine, as hereinafter more fully described.

A are the handles, B is the beam, and C is the standard, which parts are constructed and connected together in the ordinary manner.

To the lower end of the standard C is securely attached the bow or frame D, through holes in the ends of which are passed the ends of the lower cross or guard bar, E, which is secured in place by nuts screwed upon its ends. The bar E has holes formed through it, at suitable distances apart, for the passage of the teeth F, the upper ends of which pass up through holes in the upper cross-bar, G, to which they are secured by nuts. The ends of the upper cross-bar, G, pass through slots in the side bars or arms of the frame D, or through one or the other of a series of holes formed in said cross-bar for their reception. The ends of the cross-bar G are secured to the frame D by nuts, so that the said bar may be conveniently loosened and raised or lowered, to adjust the teeth to work shallower or deeper in the ground, as may be required. The frame D, cross-bars E and G, and teeth F are strengthened against the draft-strain by the forked arm H, the lower ends of which have hooks formed upon them, to hook upon the lower cross-bar, F, and the upper end of which is securely bolted to the lower end of the standard C.

I are two arms, the forward ends of which are pivoted to the lower cross-bar, E, and the rear parts of which pass through eyes formed in the lower ends of the arms J. The upper ends of the arms or rods J have screw-threads cut upon them, and pass through holes in the ends of the cross-bar K, to which they are adjustably secured by nuts placed upon them—one upon each side of the said ends of the bar K. The bar K is attached at its center to the standard C, above the frame D.

The device I J K may be adjusted to serve as a guard or gage to regulate the depth to which the plows or teeth enter the ground, as shoes or runners to support the machine when passing from place to place, or as feet to support the machine in an erect position when the handles are released by the operator.

Having thus described my invention, I claim as new and desire to secure by Letters Patent—

1. The bow or frame D, cross-bar E, teeth F, adjustable cross-bar G, and stay or brace H, with each other and with the standard C of the frame A B C, substantially as herein shown and described, and for the purposes set forth.

2. The combination of the pivoted bars I, adjustable bars J, and cross-bar K with the frame or bow D, cross-bar E, teeth F, adjustable cross-bar G, and standard C, substantially as herein shown and described, and for the purpose set forth.

B. F. WARD.

Witnesses:
N. N. EDGE,
R. L. DAUGHTRY.